United States Patent [19]

Kim

[11] 4,033,681

[45] July 5, 1977

[54] FORWARD-REVERSE MULTI SPEED FILM TRANSPORT MECHANISM

[75] Inventor: Raymond W. H. Kim, Cook County, Ill.

[73] Assignee: Bell & Howell Company, Chicago, Ill.

[22] Filed: Sept. 2, 1975

[21] Appl. No.: 609,851

[52] U.S. Cl. .............................. 352/173; 352/169; 352/194; 226/49

[51] Int. Cl.² ......................................... G03B 1/00

[58] Field of Search .......... 352/173, 169, 194, 195, 352/196, 191; 226/49

[56] References Cited

UNITED STATES PATENTS

| | | | |
|---|---|---|---|
| 3,520,596 | 7/1970 | O'Donnell | 352/173 |
| 3,556,649 | 1/1971 | Nupnau | 352/194 |
| 3,695,753 | 10/1972 | Kurasawa | 352/173 |

Primary Examiner—Monroe H. Hayes
Attorney, Agent, or Firm—John H. Moore; Richard O. Gray; John E. Peele, Jr.

[57] ABSTRACT

The disclosure relates to a forward-reverse and variable speed film transport mechanism for use in a motion picture projector. The mechanism includes an integrally formed multiple bladed shutter and up-and-down cam which are rotatable in unison on a driven shaft and an in-out cam having a plurality of surface dwelled concentric cam tracks which is rotatable about a fixed axis in response to the rotation of the shutter and up-and-down cam. The mechanism also includes a shuttle having at least one tooth for engaging the perforations of the film and a first cam follower communicating with the up-and-down cam for causing the tooth to travel in a forward direction through a predetermined stroke and in a reverse direction through a predetermined stroke. The mechanism further includes a second follower coupled to the shuttle and communicating with the dwelled cam tracks and arcuately displaceable about the fixed axis between a first and second position so that when in the first position, the second follower causes the shuttle tooth to engage the film perforations during the forward stroke and to disengage the film perforations during the reverse stroke for forward film transportation, and when in the second position, the second follower causes the shuttle tooth to engage the film perforations during the reverse stroke and to disengage the film perforations during the forward stroke for reverse film transportation. The second follower is also radially displaceable for communicating with selected one of the dwelled surface cam tracks to vary the frequency of shuttle tooth engagement with the film perforations and to thus vary the film transportation rate.

15 Claims, 6 Drawing Figures

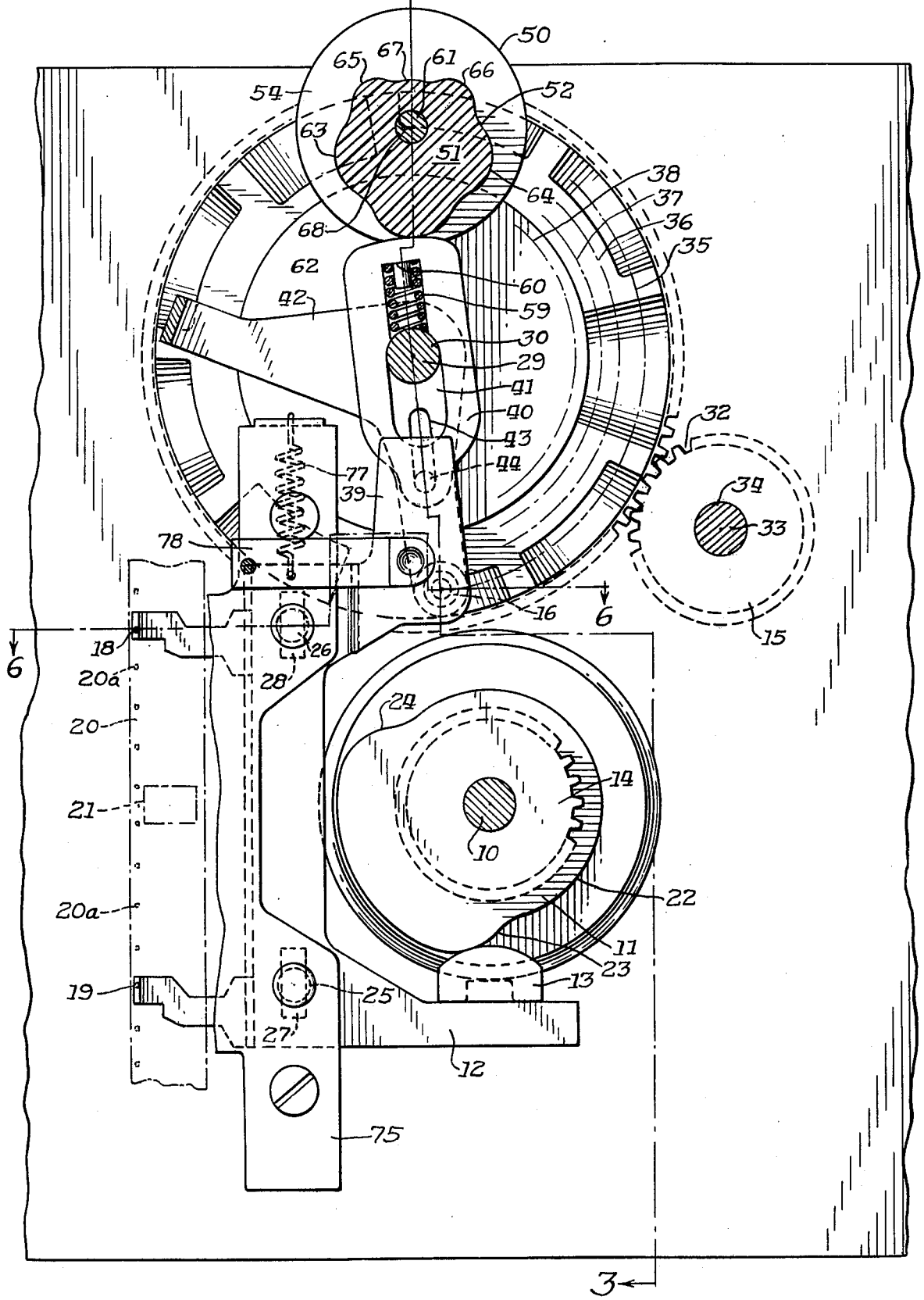

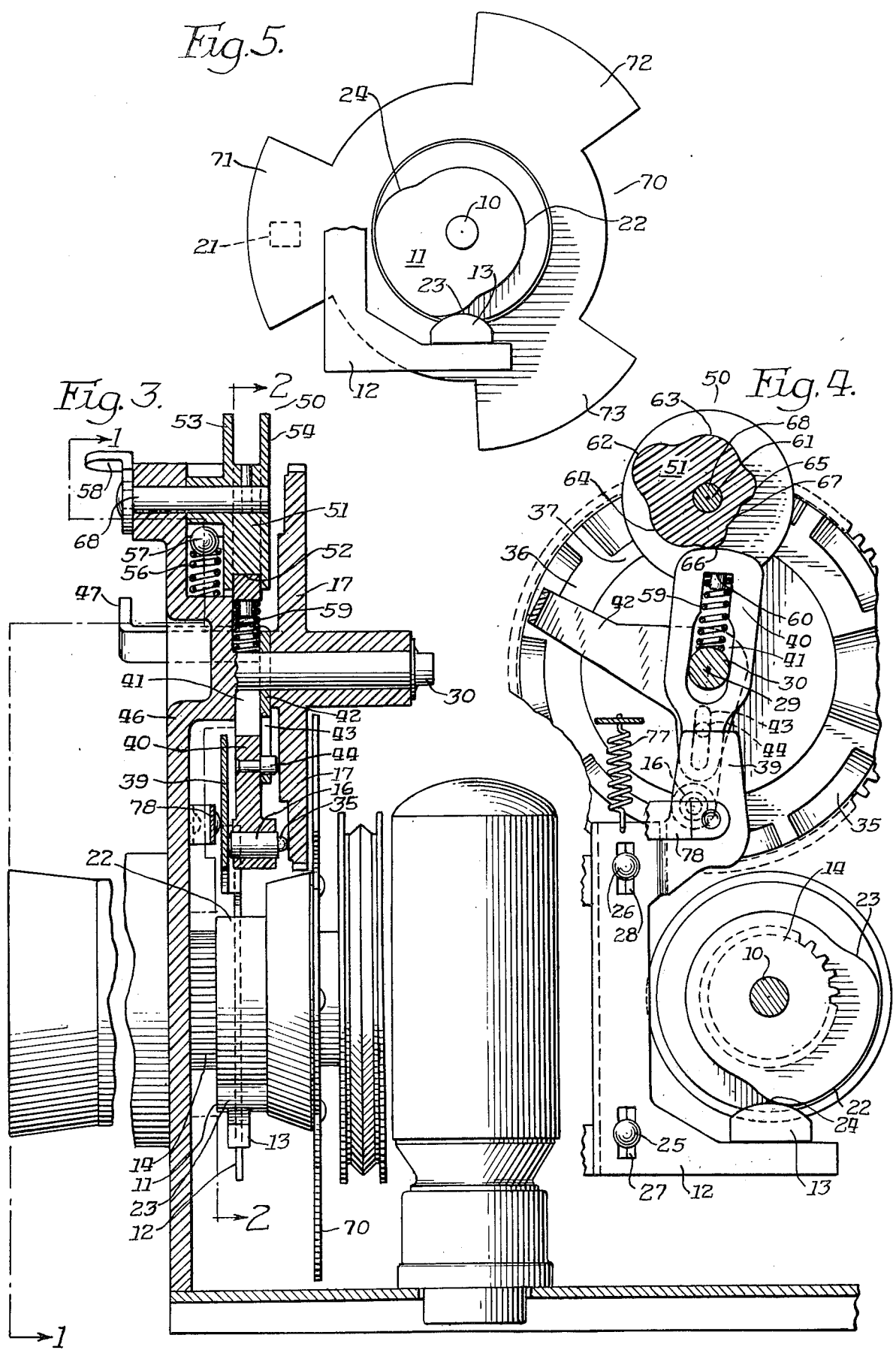

FORWARD-REVERSE MULTI SPEED FILM TRANSPORT MECHANISM

BACKGROUND OF THE INVENTION

The present invention is generally directed to motion picture projectors and more particularly to a forward-reverse and multiple speed film transport mechanism for motion picture projectors.

Film transport mechanisms for use in motion picture projectors are well known in the art. Conventional mechanisms of this type may comprise a shuttle arranged for "up-and-down" or vertical reciprocation. The shuttle is also arranged for "in-and-out" reciprocation so that a tooth or teeth carried thereby disengage the film perforations at the end of each advancing stroke and engage the perforations just prior to and during an indexing stroke. The shuttle is driven for vertical reciprocating motion by a transport cam against which the shuttle is disposed.

Such mechanisms additionally include a rotary shutter having a plurality of radially extending shutter blades, a given one of which covers the projector aperture during both forward and reverse projection. With many mechanisms of the prior art, in order to switch between forward and reverse film transportation, it has been necessary to reverse the direction of angular rotation of a shaft which is coupled to the transport cam and shutter to provide for properly synchronized forward and reverse film transportation. In other words, the direction of rotation of the rotating shaft is reversed so that the shuttle is caused to engage with the film perforations during its downward stroke for forward projection as opposed to engaging the film during its reverse stroke for reverse projection. When reversing the direction of film transportation in this manner, the same shutter blade covers the projection aperture as the film is transported. However, these arrangements are complicated and expensive in that they require complex cam arrangements.

To overcome these deficiencies, film transportation mechanisms have been devised wherein the phase relationship between the in-out and up-down cams are changed to allow for switching between forward and reverse film transportation without requiring reversal of the direction of rotation of the rotating shaft. While mechanisms of this variety have proven useful, they have experienced some difficulties. Such mechanisms require either temporary disengagement between various components when the direction of film transportation is changed to thereby exert high torque forces on such components or require cam arrangements which are shifted relative to one another. Because the timing between the in-out, up-down cams and shutter blades is critical, such arrangements are difficult to manufacture because of the required manufacturing tolerances and precise manual alignment of the various components.

It is therefore a general object of the present invention to provide a new and improved film transport mechanism for a motion picture projector.

It is another object of the present invention to provide an improved film transport mechanism for a motion picture projector which allows the direction of film feed to be reversed without requiring a reversal of the direction of rotation of the driven rotating shaft.

It is a still further object of the present invention to provide a forward-reverse film transport mechanism which is easier to assemble and maintain in operation.

It is a still more particular object of the present invention to provide a forward-reverse film transport mechanism which is less complicated than those of the prior art and which includes fewer component parts.

SUMMARY OF THE INVENTION

The invention provides a forward-reverse film transport mechanism for a motion picture projector of the type which includes a film frame aperture. The film transport mechanism comprises a drive shaft rotatable in a single angular direction, a first cam mounted on the drive shaft and having a peripheral cam surface, and a film shuttle having at least one tooth for engaging perforations of the film. The transport mechanism additionally includes a first follower coupled to the shuttle and communicating with the peripheral cam surface, the peripheral cam surface having a first portion for acting upon the first follower to cause the shuttle tooth to travel in a forward direction through a predetermined stroke and a second portion for acting upon the first follower to cause the shuttle tooth to travel in a reverse direction through a predetermined stroke, a second cam rotatable about a fixed axis of rotation and having a dwelled face cam track surface, and means for rotating the second cam responsive to rotation of the drive shaft. The film transport mechanism additionally includes a second follower coupled to the shuttle and communicating with the dwelled cam face surface for causing the shuttle tooth to engage and disengage the film perforations and also arcuately displaceable about the fixed axis of rotation between a first position and a second position such that when the second follower is in the first position, the shuttle tooth is caused to engage the film perforations during the forward stroke and to disengage the film perforations during the reverse stroke and when the second follower is in the second position, the shuttle tooth is caused to engage the film perforations during the reverse stroke and to disengage the film perforations during the forward stroke to thereby render the direction of film transportation selectable.

BRIEF DESCRIPTION OF THE DRAWINGS

The features of the present invention which are believed to be novel are set forth with particularity in the appended claims. The invention, together with further objects and advantages thereof, may best be understood by reference to the following description taken in conjunction with the accompanying drawings, and in the several figures of which like reference numerals indicate identical elements and in which:

FIG. 2 is similar to FIG. 1, the view taken on line 2—2 of FIG. 3;

FIG. 3 is a view partially in elevation and partially in cross section, the view being taken on line 3—3 of FIG. 2 and reduced in scale;

FIG. 4 is a view similar to FIG. 2 showing the mechanism in a different mode of operation;

FIG. 5 is a schematic representation of the shutter blade operation; and

DESCRIPTION OF THE PREFERRED EMBODIMENTS

Figure 1:
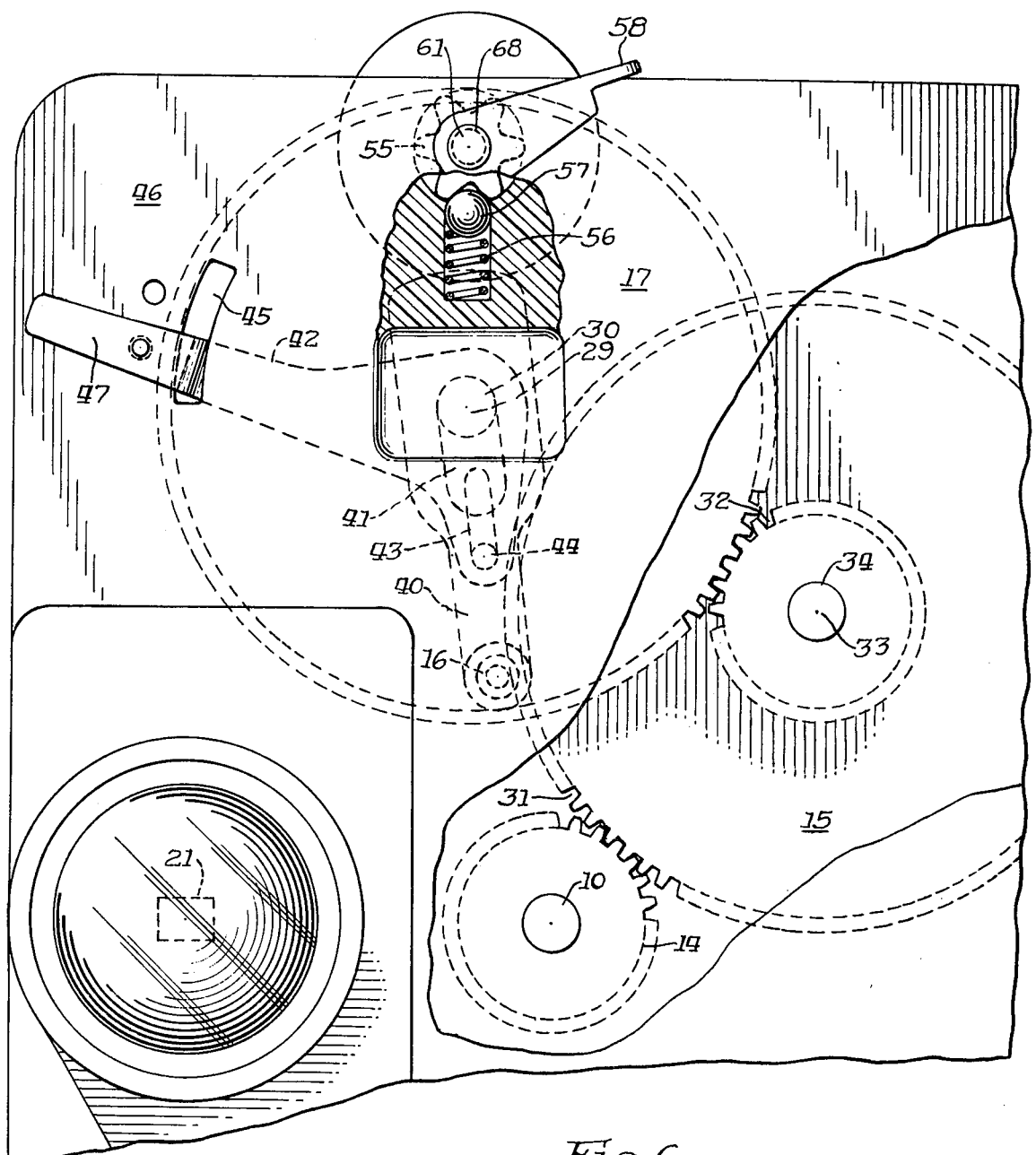
FIG. 1 is a partial elevational view of a film transport mechanism according to the invention, the view being taken on the line 1—1 of FIG. 3.

Referring now to the figures, and particularly to FIGS. 1 and 2, the film transport mechanism there shown includes a drive shaft 10, a first cam 11 hereinafter referred to as the up-down cam, a film shuttle 12, a first follower 13 hereinafter referred to as the up-down follower, a first gear 14, a second gear 15, a third gear 17, and a second follower 16 hereinafter referred to as the in-out follower. The transport mechanism transports film 20 in both the forward and reverse direction through teeth 18 and 19 on shuttle 12 which engage perforations 20a of film 20. For foward film transportation, the teeth 18 and 19 are caused to engage the perforations of the film and then the shuttle 12 is caused to travel in a downward direction through a predetermined stroke to thereby align the next film frame with the projector aperture 21. When the next film frame is aligned with aperture 21 the teeth 18 and 19 are caused to disengage the film perforations and to return to their original position through a predetermined upward stroke of the shuttle 12. Thereupon, the sequence is repeated. For reverse film transportation, the sequence of events occurs in an opposite manner. That is to say, the teeth 18 and 19 are caused to engage the film perforations and move through an upward stroke whereupon the teeth are disengaged from the film perforations and returned to their original position through a downward stroke of the shuttle.

To accomplish the above film transportation sequence, drive shaft 10, for this preferred embodiment, rotates in a counter-clockwise direction. The first gear 14 and up-down cam 11 are mounted on the drive shaft 10 and rotate in unison therewith. The up-down cam 11 has peripheral cam surface 22 which includes a first portion 23 and a second portion 24 which are angularly spaced apart with reference to rotating shaft 10 by 120°.

The up-down follower 13 is coupled to shuttle 12 and communicates with the peripheral cam surface 22 of up-down cam 11. The up-down cam 11 acts upon the up-down follower 13 and shuttle 12 such that as cam 11 rotates, first portion 23 causes the shuttle to move downward through a forward stroke and second portion 24 causes the shuttle to move upward through a reverse stroke. The shuttle is caused to return upward under the influence of spring 77. Preferably, drive shaft 10 and cam 11 rotate at an angular velocity of 18 revolutions per second in keeping with the 18 frames per second projection rate of today's projectors.

As shuttle 12 travels through its upward and downward stroke, it travels in a straight line on balls 25 and 26 which are journaled in rectangular travel guides 27 and 28, respectively. As will be more fully explained later, the balls 25 and 26 additionally allow the shuttle 12 to pivot to enable the teeth 18 and 19 to engage and disengage the film perforations.

To allow the shuttle teeth to engage and disengage the film perforations, the third gear 17 includes a dwelled face cam track surface. Gear 17 rotates about a fixed axis of rotation 29 of axle 30. The third gear rotates in a counter-clockwise direction in response to the rotation of the drive shaft 10 and first gear 14 in the following manner. Second gear 15 includes a first set of gear teeth 31 which mesh with the gear teeth of first gear 14 and a second set of gear teeth 32 which mesh with the gear teeth of third gear 17. The second gear 15 rotates about a fixed axis of rotation 33 of fixed axle 34. The first gear, second gear, and third gear, reduce the rotational speed of the third gear 17 relative to the first gear 14 by a factor of nine. As a result, first gear 14 must revolve through nine complete revolutions to cause gear 17 to revolve through one revolution.

The dwelled face cam track surface of gear 17 comprises three dwelled cam tracks 35, 36, and 37, and a fourth track 38 devoid of dwelled portions. Cam track 35 includes nine dwelled portions, cam track 36 includes three dwelled portions, cam track 37 includes one dwelled portion, and track 38 includes no dwelled portion for reasons to be explained later. The dwelled portions of cam tracks 35 and 36 are equally spaced about fixed axis 29. Also, the cam tracks 35 through 38 are concentric about fixed axis 29.

Figure 6:
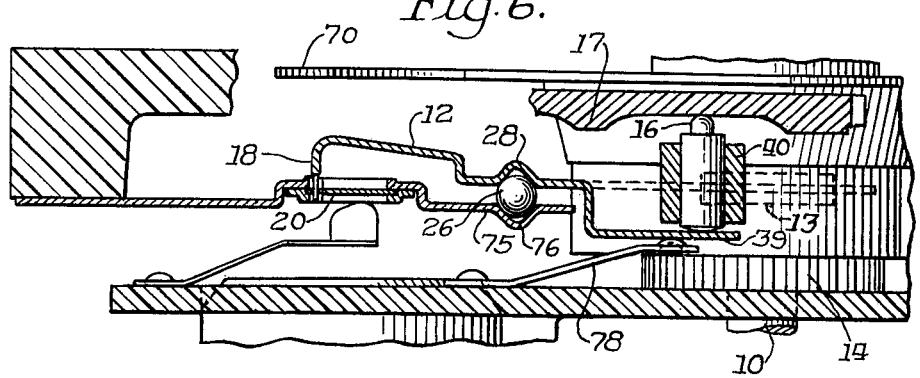
FIG. 6 is a cross sectional view taken on line 6—6 of FIG. 2.

The in-out follower 16 communicates with the cam tracks and as shown in FIG. 2 and FIG. 6, is communicating with cam track 35. The in-out follower 16 is also coupled to shuttle 12 as most clearly seen in FIG. 6 by communicating with a upper extension 39 of shuttle 12. As gear 17 rotates and as follower 16 rides up-and-down into the dwells of the dwelled cam face, the end of the upper extension 39 of shuttle 12 which includes the teeth 18 and 19 is caused to reciprocably move in-and-out of engagement with the film perforations through the pivotal action of the shuttle 12 about the balls 25 and 26. For in-out movement, the shuttle 12 acts against spring 78. Because gear 17 turns at a rate of two revolutions per second, and because there are nine dwelled portions on cam track 35, the shuttle is caused to engage and disengage the film perforations at a rate of 18 times per second in keeping with the 18 frames per second projection speed of today's projectors. The alignment relationship between follower 16 and follower 13 is such that when follower 13 is in the mid-point of a downward or forward stroke, follower 16 is in the bottom portion of a dwell, with the teeth fully protruded, as shown in FIG. 6. Also for forward film transportation, when follower 13 is midway through an upward or reverse stroke, follower 16 is at the mid-point of the area separating two adjacent dwelled portions with the teeth fully retracted. Of course, for reverse film transportation, this relationship is reversed. That is to say, for reverse film transportation, when follower 13 is at the mid-point of its downward or forward stroke, follower 16 is at the mid-point between two adjacent dwelled portions and when follower 13 is midway through an upward or reverse stroke, follower 16 is in the bottom of a dwelled portion.

For selecting either forward or reverse film transportation, the film transport mechanism, includes an elongated member 40 which includes an elongated slot 41 which receives axle 30 therein. The in-out follower 16 is mounted at the end of the elongated member 40 and is thus arcuately displaceable about fixed axis 29 as member 40 is rotated about the fixed axis. A lever arm 42 also has a circular opening for receiving axle 30 and an elongated slot 43 for receiving pin 44 which is carried by elongated member 40. The lever 42 extends radially from axle 30 and has a flanged portion 47 which extends through a slot 45 of front panel 46 of the projector as most clearly seen in FIGS. 1 and 3.

For effecting the change in the relationship between in-out follower 16 and up-down follower 13 in the manner previously described for forward and reverse transportation, lever arm 42 is angularly displaced between a first position corresponding to forward film transportation and a second position corresponding to reverse film transportation. As shown in FIG. 2, the mechanism is established in the forward film transportation mode. In this mode, when follower 13 is midway through its downward or forward stroke, follower 16 is in the bottom or mid-point of a dwell. Also, becuase the first and second peripheral cam portions 23 and 24 are 120° apart, and the rotational speed of the third gear 17 relative to the first gear 14 is reduced by a factor of nine, to switch to the reverse transportation mode, the in-out follower 16 must be displaced by an angular distance equal to 120° divided by the gear reduction factor of nine. Thus, to switch from the first position or forward transportation mode as shown in FIG. 2 to the reverse projection mode corresponding to the second position of the follower, the in-out follower 16 must be displaced by 13° 20 minutes. This condition is shown in FIG. 4.

As previously mentioned, the transport mechanism of the present invention is capable of transporting film at rates of 18, 6, 2, and 0 (still) frames per second to thereby render reverse projection at normal rates, two different slow motion rates, and still projection. To this end, elongated member 40, in addition to being arcuately displaceable about fixed axes 29 is also radially displaceable for engaging selected ones of cam tracks 35, 36, 37, and 38. Elongated member 40 is free to move radially by the elongated slots 43 and 41.

The in-out follower 16 is caused to incrementally engage the cam tracks through a detented cam arrangement 50 which is best seen in FIGS. 1, 2, and 3. The detented cam arrangement 50 includes cam 51 which has a contoured cam surface 52, a pair of walls 53 and 54 confining cam 51 and adapted to receive elongated member 40, detent cam 55, spring 56, detent ball 57, and lever 58. The mechanism also includes spring 59 which is disposed between axle 30 and an inner portion 60 of elongated member 40 to maintain elongated member 40 in continuous communication with the contoured cam surface 52. Also, the detent cam arrangement rotates about axis 61 on shaft 68.

As can best be seen in FIG. 2, the contoured cam surface 52 includes a plurality of rounded portions which act upon elongated member 40 to cause it to move radially by pre-selected distances to cause in-out follower 16 to engage the cam tracks 35, 36, 37, and 38 as lever 58 is rotated. Rounded portion 62 as shown in FIG. 2 causes follower 16 to engage cam track 35 to cause the film to be transported at a rate of 18 frames per second. When either rounded portion 63 or 64 engages elongated member 40, the follower 16 engages cam track 36 for a film transportation rate of 6 frames per second. When either rounded portion 65 or 66 engages elongated member 40, the follower 16 engages cam track 37 for a film transportation rate of 2 frames per second. Lastly, when rounded portion 67 engages elongated member 40, the follower 16 is caused to engage cam track 38 which is devoid of dwells and thus causes the shuttle teeth to be continuously disengaged from the film perforations to thereby preclude film transportation for still projection. As can be seen in FIG. 2, the cam 51 is symmetrical in that rounded portions 63 and 65 have corresponding rounded portions 64 and 66 respectively on the other side of the cam. This allows the film projection rate to be altered by turning lever 58 in either a clockwise or counterclockwise direction.

The detent cam 55 and detent ball 57 cooperate to cause the various rounded portions of contoured cam surface 52 to incrementally engage elongated member 40 to thus cause follower 16 to incrementally engage the various cam tracks. As shown in FIG. 2, the mechanism is set for a film projection rate of 18 frames per second (in forward) and as shown in FIG. 4, the mechanism is set for a film projection rate of 2 frames per second (in reverse) because follower 16 is engaged with cam track 37.

A film transportation rate of 18 frames per second obtains when follower 16 is in engagement with cam track 35 because cam track 35 includes nine equally spaced dwelled portions. Because there is a nine to one gear reduction ratio between gear 14 and gear 17, for each revolution of up-down cam 11, follower 16 will engage a dwell causing the shuttle teeth 18 and 19 to engage the film. Because drive shaft 10 and thus cam 11 rotates at a rate of 18 revolutions per second, the film will be engaged 18 times per second and thus be transported at that rate.

When cam follower 16 is engaged with cam track 36, the film is transported at a rate of 6 frames per second because cam track 36 includes three equally spaced dwelled portions. Thus, the shuttle teeth 18 and 19 will be caused to engage the film perforations at a rate which is one-third the rate when cam follower 16 engages track 35 and therefore the film will be transported at a rate of 6 frames per second. Even though the film is engaged at a rate of 6 times per second, cam 11 is still caused to rotate at a rate of 18 revolutions per second. Thus, by moving follower 16 radially, the frequency in which shuttle teeth 18 and 19 engage the film is varied and thus the speed of film transportation is varied and rendered selectable by the detent cam arrangement.

When follower 16 engages track 37, the film is transported at a rate of 2 frames per second because track 37 includes just one dwelled portion. Thus, the film is engaged at a rate of one-nineth the rate of engagement when follower 16 is engaged with track 35 and thus a film transportation rate of 2 frames per second is obtained.

When follower 16 engages track 38, the mechanism will operate in a still projection mode. This obtains because track 38 is devoid of dwelled portions and maintains the shuttle teeth in continuous disengagement from the film perforations to thereby preclude film transportation.

As the film is transported, aperture 21 is intermittently blocked by a multiple bladed shutter 70 which is best seen in FIGS. 3, 5, and 6. The shutter 70 is mounted on drive shaft 10 and includes three equally spaced and radially extending blades 71, 72, and 73. The shutter 70 has three blades, one for covering the aperture as the film is caused to travel during the predetermined forward or reverse stroke and the other two for blocking the aperture 21 to avoid flicker in the projected image.

Because the shutter 70 has three equally spaced blades, the blades are spaced apart by 120°. Recalling for a moment that the first and second portions 23 and 24, respectively of cam surface 22 are 120° apart, one of the shutter blades will cover the aperture 21 during forward film transportation and another one of the blades will cover the aperture during reverse film transportation. Shutter blade 71 will cover aperture 21 during the time in which the shuttle teeth 18 and 19 are engaged with the film and travelling through their predetermined downward or forward stroke. In a similar manner, shutter blade 72 will cover aperture 21 during reverse film transportation when the shuttle teeth are engaged with the film perforations and travelling through their upward or reverse predetermined stroke. Of course, the forward and reverse direction correspond to the first and second positions of in-out follower 16. Because the shutter is mounted on drive shaft 10 and rotates therewith at a constant rate of 18 revolutions per second, even when the mechanism is in a slow motion mode or still mode, the aperture 21 will be covered 54 times per second to thereby preclude flicker in the projected image.

As previously explained, the shuttle moves in straight line motion through its forward and reverse stroke and also pivots upon balls 25 and 26 to engage and disengage the film. Balls 26 and 27 communicate with the shuttle 12 in rectangular guides 27 and 28 one of which is shown in FIG. 6. The ball is disposed between rectangular guides 27 and 28 and rectangular guides of a plate 75, one such guide 76 also being shown in FIG. 6.

To provide for the returning of the shuttle for its straight line motion and pivotable motion, suitable springs 77 and 78 are provided. Thus, when shuttle 12 is caused to move downward during the forward stroke it does so against the tension of spring 77 and returns under the tension of spring 77 when up-down follower 13 communicates with the second portion 24 of cam surface 22. In a similar manner, the shuttle is caused to engage and disengage the film perforations. Springs of this nature are well known in the art and need not be described in detail herein.

The mechanism of the present invention is much less costly to manufacture and more convenient to manufacture because the up-down cam 11, gear 14, and shutter 70 may be integral to one another and thus form one component part. Additionally, because the various rotating members of the mechanism, namely gear 14, gear 15, and gear 17 rotate about fixed axes of rotation, delicate and accurate manual alignment is unnecessary for establishing the proper timing between the up-down cam, in-out cam, and shutter 70 to obtain and maintain proper mechanism performance. Also, because the various elements of the mechanism are continuously in engagement when direction of film transportation is changed, torque forces on the various components are obviated reducing the likelihood of component failure.

While a particular embodiment of the invention has been shown and described, modification may be made, and it is intended in the appended claims to cover all such modifications as may fall within the true spirit and scope of the invention.

We claim:

1. In a motion picture projector of the type which includes a film frame aperture, a forward-reverse film transport mechanism comprising:
    a drive shaft rotatable in a single angular direction;
    a first cam mounted on said drive shaft and having a peripheral cam surface;
    a film shuttle having at least one tooth for engaging perforations of the film;
    a first follower coupled to said shuttle and communicating with said peripheral cam surface, said peripheral cam surface having a first portion for acting upon said first follower to cause said shuttle tooth to travel in a forward direction through a predetermined stroke and a second portion for acting upon said first follower to cause said shuttle tooth to travel in a reverse direction through a predetermined stroke;
    a second cam rotatable about a fixed axis of rotation and having a dwelled face cam track surface comprising a plurality of concentric dwelled cam tracks, each said track including a different number of dwelled portions;
    means for rotating said second cam responsive to rotation of said drive shaft; and
    an elongated member slideably and rotatably movable about said fixed axis and having a second follower mounted thereon for changing both the direction and speed of film transportation, said second follower communicating with said shuttle and said dwelled cam face surface for causing said shuttle tooth to engage and disengage the film perforations as said second cam rotates, said second follower being arcuately displaceable about said fixed axis of rotation between a first position and a second position in response to rotation of said elongated member such that when said second follower is in said first position said shuttle tooth is caused to engage the film perforations during said forward stroke and to disengage the film perforations during said reverse stroke and when said second follower is in said second position said shuttle tooth is caused to engage the film perforations during said reverse stroke and to disengage the film perforations during said forward stroke to thereby render the direction of film transportation selectable, said second follower also being radially displaceable about said fixed axis in response to sliding movement of said elongated member for engaging selected ones of said tracks to thereby render the frequency of shuttle tooth engagement with the perforations and thus the speed of film transportation selectable, whereby both the speed and direction of film transportation is controlled by the movement of the second follower about the fixed axis of rotation of said second cam.

2. A mechanism in accordance with claim 1 further comprising a lever arm also received by said fixed axis and arcuately displaceable about said fixed axis and coupled to said elongated member whereby, as said lever arm is arcuately displaced about said fixed axis, said second follower is caused to move between said first and second positions.

3. A mechanism in accordance with claim 2 further comprising a detented cam having a contoured peripheral cam surface communicating with said elongated member and wherein said contoured peripheral cam surface acts upon said elongated member as said detented cam is rotated to incrementally bring said second follower into engagement with said concentric cam face tracks.

4. A mechanism in accordance with claim 1 further comprising a shutter comprising a plurality of equally spaced radially extending blades mounted for rotation on said drive shaft and wherein one of said blades covers the film frame aperture when said second follower is in said first position and during forward film travel and wherein another one of said blades covers the film frame aperture when said second follower is in said second position and during reverse film travel.

5. A mechanism in accordance with claim 4 wherein said first and second portions of said peripheral cam track surface are angularly spaced by approximately 120° and wherein said shutter comprises three blades.

6. In a motion picture projector of the type which includes a film frame aperture, a forward-reverse film transport mechanism comprising:
   a drive shaft rotatable in a single angular direction;
   a first cam mounted on said drive shaft and having a peripheral cam surface;
   a film shuttle having at least one tooth for engaging perforations of the film;
   a first follower coupled to said shuttle and communicating with said peripheral cam surface, said peripheral cam surface having a first portion for acting upon said first follower to cause said shuttle tooth to move in a forward direction through a predetermined stroke and a second portion for acting upon said first follower to cause said shuttle tooth to move in a reverse direction through a predetermined stroke;
   a first gear also mounted on said drive shaft;
   a second gear engaged with said first gear and mounted for rotation in opposition to the rotation of said first gear about a first fixed axis of rotation;
   a third gear rotatable about a second fixed axis of rotation engaged with said second gear and having a dwelled face cam track surface comprising a plurality of concentric dwelled cam tracks, each said track including a different number of dwelled portions; and
   an elongated member slideably and rotatably movable about said second fixed axis and having a second follower mounted thereon for changing both the direction and speed of film transportation said second follower communicating with said shuttle and said dwelled cam face surface for causing said shuttle tooth to engage and disengage the film perforations as said second cam rotates said second follower being arcuately displaceable about said second fixed axis of rotation between a first position and second position in response to rotation of said elongated member such that when said second follower is in said first position said shuttle tooth is caused to engage the film perforations during its forward stroke and to disengage the film perforations during its reverse stroke and when said second follower is in said second position said shuttle tooth is caused to engage the film perforations during its reverse stroke and to disengage the film perforations during its forward stroke to thereby render the direction of film transportation selectable, said second follower also being radially displaceable about said second fixed axis in response to sliding movement of said elongated member for engaging selected ones of said tracks to thereby render the frequency of shuttle tooth engagement with the perforations and thus the speed of film transportation selectable.

7. A mechanism in accordance with claim 6 further comprising a lever arm also received by said second fixed axis and arcuately displaceable about said second fixed axis and coupled to said elongated member whereby, as said lever arm is arcuately displaced about said fixed axis, said second follower is caused to move between said first and second positions.

8. A mechanism in accordance with claim 7 further comprising a detented cam having a contoured peripheral cam surface communicating with said elongated member and wherein said contoured peripheral cam surface acts upon said elongated member as said detented cam is rotated to incrementally bring said second follower into engagement with said concentric cam face tracks.

9. A mechanism in accordance with claim 8 further comprising a pin carried by said elongated member and wherein said lever arm includes an elongated slot capturing said pin so that as said lever arm is rotated about said second fixed axis, said pin and said slot coact to cause said second follower to be arcuately displaced about said second fixed axis and as said detented cam rotates, said pin rides with said slot.

10. A mechanism in accordance with claim 9 wherein said elongated member includes a second elongated slot capturing said second fixed axis so that as said detented cam is rotated, said second elongated slot rides on said second fixed axis.

11. A mechanism in accordance with claim 6 further comprising a shutter comprising a plurality of equally spaced radially extending blades mounted for rotation on said drive shaft and wherein one of said blades covers the film frame aperture when said second follower is in said first position and during forward film travel and wherein another one of said blades covers the film frame aperture when said second follower is in said second position and during reverse film travel.

12. A mechanism in accordance with claim 11 wherein said first and second portions of said peripheral cam track surface are angularly spaced by approximately 120° and wherein said shutter comprises three blades.

13. A mechanism in accordance with claim 11 wherein said first cam, said first gear, and said shutter are integrally formed together.

14. A mechanism in accordance with claim 12 wherein said first gear, said second gear, and said third gear reduce the rotational speed of said third gear relative to the rotational speed of said first gear by a given factor, and wherein the angular distance between said first and second positions of said second follower is equal to said 120° spacing of said first and second portions of said peripheral cam track divided by said factor.

15. A mechanism in accordance with claim 14 wherein said given factor is 9.

* * * * *